(12) United States Patent
Tsirkin

(10) Patent No.: US 12,007,891 B2
(45) Date of Patent: *Jun. 11, 2024

(54) STORAGE DEDUPLICATION FOR CONTAINERS WITH ENCRYPTED STORAGE

(71) Applicant: Red Hat, Inc., Raleigh, NC (US)

(72) Inventor: Michael Tsirkin, Haifa (IL)

(73) Assignee: Red Hat, Inc., Raleigh, NC (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/582,524

(22) Filed: Jan. 24, 2022

(65) Prior Publication Data

US 2022/0147450 A1   May 12, 2022

Related U.S. Application Data

(63) Continuation of application No. 16/585,154, filed on Sep. 27, 2019, now Pat. No. 11,232,030.

(51) Int. Cl.
| | | |
|---|---|---|
| *G06F 12/06* | (2006.01) | |
| *G06F 9/445* | (2018.01) | |
| *G06F 9/455* | (2018.01) | |
| *G06F 12/14* | (2006.01) | |

(52) U.S. Cl.
CPC ...... *G06F 12/0646* (2013.01); *G06F 9/44594* (2013.01); *G06F 9/45558* (2013.01); *G06F 12/1408* (2013.01); *G06F 2009/45579* (2013.01); *G06F 2009/45583* (2013.01);

(Continued)

(58) Field of Classification Search
None
See application file for complete search history.

(56) References Cited

U.S. PATENT DOCUMENTS

| | | |
|---|---|---|
| 8,706,947 B1 | 4/2014 | Vincent |
| 8,856,544 B2 | 10/2014 | Bosch et al. |

(Continued)

FOREIGN PATENT DOCUMENTS

| | | |
|---|---|---|
| CN | 101976202 | 2/2011 |
| WO | 2015043376 | 4/2015 |
| WO | 2018182772 | 10/2018 |

OTHER PUBLICATIONS

Hegarty, Steve, "Backup and De-duplication of Encrypted Data", Feb. 15, 2018, DELL EMC, https://stevehegarty.wordpress.com/2018/02/15/backup-and-de-duplication-of-encrypted-data/, 4 pages.

(Continued)

*Primary Examiner* — Yaima Rigol
(74) *Attorney, Agent, or Firm* — Womble Bond Dickinson (US) LLP

(57) ABSTRACT

Technology for enabling a kernel to perform data deduplication on encrypted storage of a container. An example method may involve: enabling, by a kernel, a guest program of a container to access a first storage block of a first container and a second storage block of a second container; receiving, by the kernel from the guest program, an indication that the first storage block and the second storage block are duplicate storage blocks; and updating the first storage block or the second storage block to cause the duplicate storage blocks to reference a common storage location.

20 Claims, 7 Drawing Sheets

(52) U.S. Cl.
CPC ............ *G06F 2212/1044* (2013.01); *G06F 2212/151* (2013.01); *G06F 2212/657* (2013.01)

(56) References Cited

U.S. PATENT DOCUMENTS

| | | | |
|---|---|---|---|
| 8,909,845 B1* | 12/2014 | Sobel | G06F 9/45558 |
| | | | 711/6 |
| 9,176,889 B1 | 1/2015 | Earhart | |
| 8,977,842 B1 | 3/2015 | McCorkendale et al. | |
| 9,069,477 B1 | 6/2015 | Overton | |
| 9,215,066 B2 | 12/2015 | Moffat et al. | |
| 9,652,634 B2 | 5/2017 | Wang et al. | |
| 9,798,486 B1 | 10/2017 | Singh | |
| 9,823,842 B2* | 11/2017 | Gopalan | G06F 9/455 |
| 9,940,060 B1 | 4/2018 | Colgrove | |
| 10,152,234 B1 | 12/2018 | Martin | |
| 10,404,674 B1 | 9/2019 | Bshara et al. | |
| 2009/0182789 A1 | 7/2009 | Sandorfi | |
| 2011/0131571 A1* | 6/2011 | Heim | G06F 9/45558 |
| | | | 718/1 |
| 2015/0242159 A1 | 8/2015 | Tsirkin | |
| 2015/0381589 A1 | 12/2015 | Tarasuk-Levin | |
| 2016/0328257 A1 | 11/2016 | Hudzia | |
| 2016/0359622 A1 | 12/2016 | Bunch et al. | |
| 2017/0123710 A1 | 5/2017 | Fisher | |
| 2017/0169233 A1 | 6/2017 | Hsu et al. | |
| 2017/0277898 A1 | 9/2017 | Powell | |
| 2017/0364263 A1* | 12/2017 | Lublin | G06F 12/02 |
| 2018/0032447 A1 | 2/2018 | Kaplan | |
| 2018/0059956 A1* | 3/2018 | Tsirkin | H03M 7/3091 |
| 2018/0239772 A1 | 8/2018 | Vijayan | |
| 2018/0276145 A1 | 9/2018 | Tsirkin et al. | |
| 2019/0026476 A1 | 1/2019 | Van Riel et al. | |
| 2019/0068557 A1 | 2/2019 | Noel et al. | |
| 2019/0179538 A1 | 6/2019 | van Riel et al. | |
| 2020/0004568 A1 | 1/2020 | Candido de Lima, Jr. et al. | |
| 2020/0310972 A1 | 10/2020 | Shanbhogue | |

OTHER PUBLICATIONS

Fischer et al., "On the Detection of Applications in Co-Resident Virtual Machines via a Memory Deduplication Side-Channel", 2018, Department of Computer Science University of Hamburg, Germany, https://svs.informatik.uni-hamburg.de/publications/2018/2018-12-Lindemann-Application-Detection.pdf, 15 pages.

Jin et al., "H-SVM: Hardware-assisted Secure Virtual Machines under a Vulnerable Hypervisor", Jan. 9, 2015, IEEE, https://ieeexplore.ieee.org/abstract/document/7005439, 14 pages.

Ning et al, "Group-Based Memory Deduplication against Covert Channel Attacks in Virtualized Environments," 2016, Institute of Information Engineering, https://ieeexplore.ieee.org/document/7846946, 7 pages.

Xiao et al., "Security Implications of Memory Deduplication in a Virtualized Environment," Aug. 2016, The College of William and Mary, http://citeseerx.ist.psu.edu/viewdoc/download?doi=10.1.1.443.9263&rep=rep1&type=pdf, 12 pages.

* cited by examiner

STORAGE DEDUPLICATION FOR CONTAINERS WITH ENCRYPTED STORAGE

RELATED APPLICATIONS

The present application is a continuation of application Ser. No. 16/585,154, filed Sep. 27, 2019, entitled "STORAGE DEDUPLICATION FOR VIRTUAL MACHINES WITH ENCRYPTED STORAGE," which is incorporated by reference herein.

TECHNICAL FIELD

The present disclosure is generally related to data storage management, and more particularly, to management of storage devices that provide hardware-level storage encryption.

BACKGROUND

Modern computer systems perform data deduplication to improve the utilization of data storage resources. Data deduplication is a technique that removes duplicate copies of repetitive data to enable more data to be stored within a data storage device. The technique of data deduplication may involve identifying chunks of data (e.g., byte patterns) that are stored within the data storage resource. The chunks are compared to other chunks stored within the data storage resource and when a match occurs, redundant chunks are replaced with small references that point to one of the other redundant chunks. Given that the same chunk or byte pattern may occur dozens, hundreds, or even thousands of times, the amount of storage resources consumed to store the data can be greatly reduced using deduplication.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
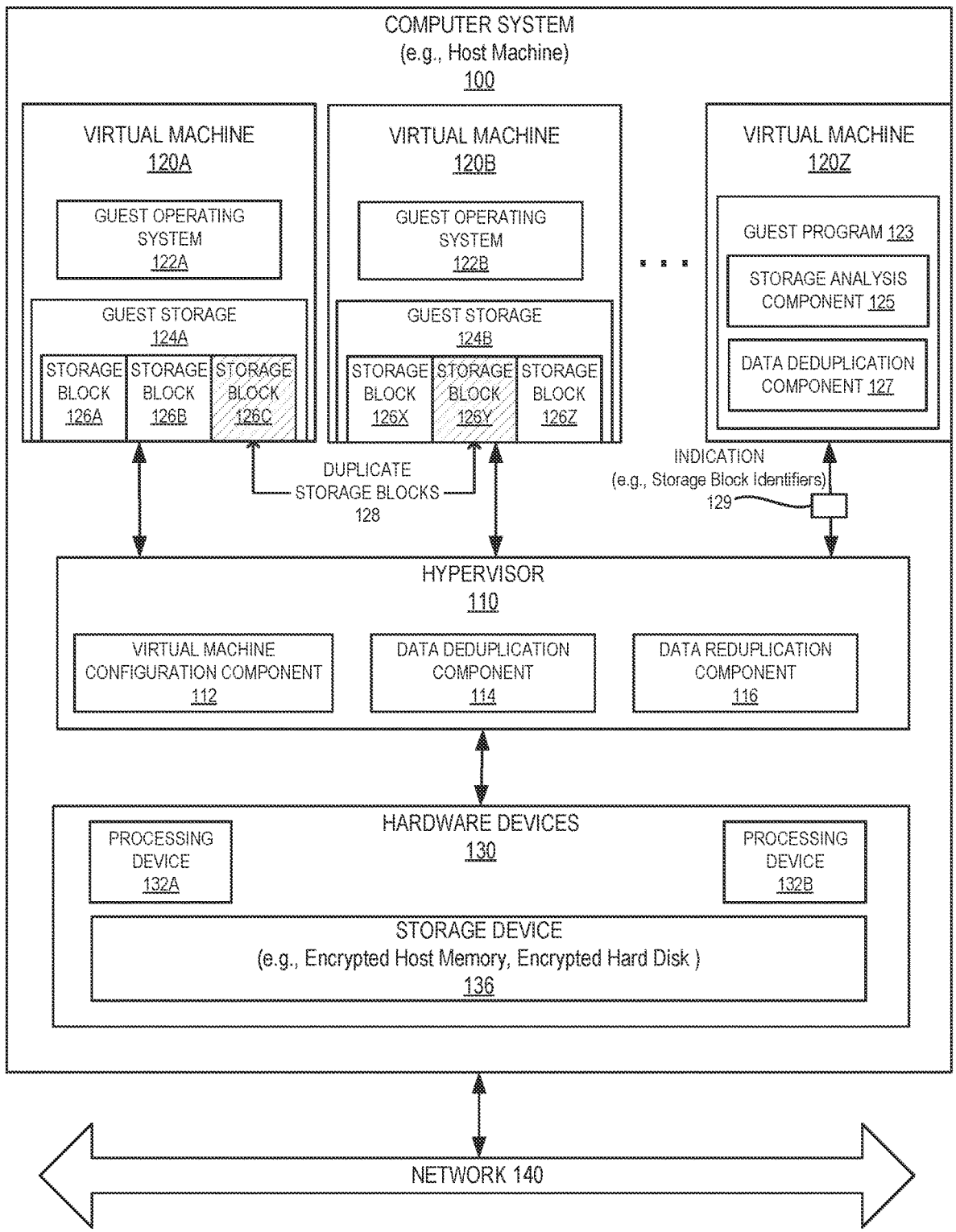
FIG. 1 depicts a high-level block diagram of an example computer system architecture that enables a hypervisor to perform data deduplication on the encrypted data storage of one or more virtual machines, in accordance with one or more aspects of the present disclosure.

Computer systems often use cryptographic functions to encrypt data stored within a storage device. The cryptographic functions may use variations in cryptographic input so that two instances of the same content appear different after they are encrypted. Having different encrypted versions of the same content may enhance security but may cause data deduplication techniques to be unable to properly or efficiently detect duplicates in the underlying content. In some examples, the cryptographic function may be performed by a combination of hardware and lower-level code (e.g., firmware) and may use cryptographic keys that may be concealed from higher-level code (e.g., hypervisor). The higher-level executable code may request the data and the hardware may or may not decrypt the data before fulfilling the request for the data. For example, if the data is associated with a virtual machine, then a request by the guest operating system of the virtual machine may be fulfilled with a decrypted version of the data but a request from the hypervisor may be fulfilled with an encrypted version of the data. This causes the hypervisor to be unable to compare the decrypted versions of the data and may cause hypervisor level data deduplication to be ineffective.

Aspects of the present disclosure address the above and other deficiencies by providing technology to enable a hypervisor to use a guest program executed by a virtual machine to perform comparisons to enable the hypervisor to perform data deduplication on encrypted storage. In one example, the hypervisor may configure a virtual machine to enable the guest program to access guest storage of multiple different virtual machines. The guest program may compare storage blocks and determine whether they are duplicates. The storage blocks being compared may be selected by the hypervisor or the guest program and may contain equivalent decrypted content. The storage blocks may be based on any data storage that is capable of storing data and may correspond to volatile data storage devices, non-volatile data storage devices, or a combination thereof. The data of the storage blocks may be encrypted using a cryptographic function in view of one or more cryptographic inputs (e.g., location based key and a shared key). The cryptographic function may be executed by the hardware and some or all of the cryptographic input (e.g., decryption keys) may be concealed or temporarily hidden from the hypervisor, guest program, guest operating systems, or a combination thereof. The hardware may decrypt the data in the storage blocks when the virtual machine attempts to access the data (e.g., guest program) and may avoid decrypting the data when the hypervisor attempts to access the data. This may enable the guest program to compare a plaintext version of the data as opposed to ciphertext versions that would get compared if the comparison were performed by the hypervisor. This enables the guest program to identify duplicate storage blocks even when the storage blocks are encrypted with different cryptographic keys. The guest program may then indicate to the hypervisor which of storage blocks are duplicates so that the hypervisor can remove one or more of the duplicate storage blocks. Removing duplicate storage blocks may involve updating one or more of the duplicate storage blocks to reference a common storage location (e.g., location of one of the duplicates), which may free up the storage locations associated with the other duplicate storage.

The guest program performing the comparisons may be executed by a virtual machine that is the target of the storage deduplication (e.g., VM affected by deduplication process) or may be executed by an auxiliary virtual machine. The auxiliary virtual machine may or may not have storage that is affected by the deduplication and in one example may be a lean virtual machine. The lean virtual machine may have a reduced processing and storage footprint and may be dedicated to performing the storage deduplication tasks. The lean virtual machine may execute the guest program (e.g., guest driver, guest kernel, executable code, etc.) to perform tasks for the deduplication without having all of the features of a full guest operating system. In one example, the hypervisor may initiate or activate the virtual machine or guest program performing the deduplication in response to detecting reduced storage availability (e.g., below a threshold value) and may deactivate the virtual machine or guest program when the storage availability recovers (e.g., exceeds a threshold value).

The systems and methods described herein include technology that enables data deduplication in a security enhanced computing environment. In particular, aspects of the present disclosure may enable a hypervisor to perform data deduplication on encrypted storage blocks without the hypervisor accessing the content of the storage blocks in a decrypted form. Aspects of the present disclosure may be performed on volatile data storage or non-volatile data storage and may enhance a computer system's ability to perform data deduplication on memory resources, hard disk resources, solid-state storage resources, other storage resources, or a combination thereof.

Various aspects of the above referenced methods and systems are described in details herein below by way of examples, rather than by way of limitation. The examples provided below discuss a virtualized computer system where the data deduplication may be performed by aspects of a virtual machine, hypervisor, a host operating system, or a combination thereof. In one example, the data deduplication may be performed in a non-hardware virtualized computer system that is absent a hypervisor. The non-hardware virtualized computer system may include a kernel of an operating system that performs data deduplication on encrypted storage of one or more user space programs. In another example, the computer system may include operating system level virtualization and the memory management features (e.g., kernel, docker) may perform data deduplication on encrypted storage of one or more containers using techniques discussed herein.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines that may be arranged in a homogenous or non-homogenous group (e.g., cluster system, grid system, or distributed system). Computer system 100 may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include hypervisor 110, virtual machines 120A-Z, hardware devices 130, and network 140.

Hypervisor 110 may also be known as a virtual machine monitor (VMM) and may provide virtual machines 120A-Z with access to one or more features of hardware devices 130. Hypervisor 110 may run directly on the hardware of computer system 100 (e.g., bare metal hypervisor) or may run on or within a host operating system (not shown). In the example shown in FIG. 1, hypervisor 110 may include a virtual machine configuration component 112, a data deduplication component 114, and a data reduplication component 116, which are discussed in more detail below in regards to FIG. 2. Hypervisor 110 may manage virtual machines 120A-Z and provide them with access to system resources. Each of the virtual machines 120A-Z may be based on hardware emulation and may support para-virtualization, operating system-level virtualization, or a combination thereof. Virtual machines 120A-B may have the same or different types of guest operating systems 122A-B and virtual machine 120Z may be absent a guest operating system.

Guest operating systems 122A-B may be any program or combination of programs that are capable of managing computing resources of a virtual machine. In one example, guest operating systems 122A-B may include Linux®, Solaris®, Microsoft Windows®, Apple Macintosh (MacOS®), other operating system, or a combination thereof. Guest operating systems 122A-B may manage the execution of multiple processes that provide one or more computing services.

Guest program 123 may be a part of a full guest operating systems (e.g., 122A-B) or may be executable code that is separate from a full guest operating system as shown in FIG. 1. Guest program 123 may be any code that is capable of being executed by a virtual machine and may or may not include a guest kernel, guest applications, other program, or a combination thereof. Guest program 123 may comprise one or more kernel space programs (e.g., memory driver, network driver, file system driver) for interacting with emulated hardware or physical hardware. In one example, guest program 123 may be similar to a micro kernel or other kernel that provides a near-minimum amount of software that can provide mechanisms to manage storage resources. The mechanisms may include low-level address space management, thread management, inter-process communication (IPC), other services, or a combination thereof. Guest program 123 may be capable of managing, interacting, or interfacing with virtual devices (e.g., emulated devices), physical devices (e.g., actual tangible devices), other devices, or a combination thereof.

Hypervisor 110 may configure computer system 100 so that guest program 123 may be configured to access guest storage assigned to multiple different virtual machines 120A-Z. For example, guest program 123 may have access to guest storage of virtual machine 120Z and also access to guest storage of virtual machines 120A and 120B (e.g., guest storage 124A-B).

Guest storage 124A-B may be any virtual data storage, logical data storage, physical data storage, other storage, or a combination thereof for storing, organizing, or accessing data. Guest storage 124A-B may each correspond to a portion of storage device 136 that has been designated for use by the respective virtual machine. Guest storage 124A-B may function as volatile data storage or non-volatile data storage as discussed below in regards to storage device 136. Guest storage 124A-B may be organized into one or more storage blocks 126A-Z.

Storage blocks 126A-Z may be used for storing, organizing, or accessing data and may include a contiguous or non-contiguous sequence of bytes or bits. Each of the storage blocks 126A-Z may be referred to as a guest storage block and may correspond to a logical data storage unit, physical data storage unit, or a combination thereof. In one example, the logical storage unit (e.g., guest page) may include data in an unencrypted form and may correspond to a physical storage unit (e.g., host page frame) that includes the data in an encrypted form. A logical data storage unit may have a block size which may be the same or different from a block size of the underlying physical data storage unit. The block size may be a fixed-size, such as a particular integer value (e.g., 4 KB) or may be a variable-size that varies within a range of integer values. In one example, storage blocks 126A-Z may be memory blocks and each memory block may correspond to an individual memory page, multiple memory pages, or a portion of a memory page. The memory pages may be guest physical memory or guest physical memory pages and may correspond one-to-one or many-to-one with a hypervisor memory page (e.g., host memory page). In another example, each of the storage blocks 126A-Z may correspond to a portion (e.g., sector, logical unit, region, volume, partition, etc.) of a mass storage device (e.g., hard disk) or other storage device. In either example, storage blocks 126A-Z may include duplicate storage blocks 128.

Duplicate storage blocks 128 may be different storage blocks that store equivalent data. The equivalent data may be the same identical data (e.g., bit-for-bit match) or may be substantially similar data (e.g., subset of data is bit-for-bit match). Substantially similar data is data that includes one or more portions that are identical and one or more portions that are not identical. The one or more portions that are not identical may be referred to as different data and may be at the beginning, end, or other position within the storage block. The different data may be padding data (e.g., data to fill remaining portion of storage block), prior use data (e.g., data left over from earlier write), descriptive data (e.g., little-endian, big-endian), other data, or a combination thereof. In the example shown, duplicate storage blocks 128 may correspond to storage block 126C of virtual machine 120A and storage block 126Y of virtual machine 120B. Storage blocks 126C and 126Y may have padding data at the beginning or end that does not match one another but a remaining portion of data in the respective storage blocks may be identical.

Guest program 123 may be configured to detect duplicate storage blocks 128 using storage analysis component 125 and data deduplication component 127. Storage analysis component 125 may analyze storage blocks 126A-Z and select storage blocks that have an increased chance (e.g., higher probability) of containing duplicate content. Storage analysis component 125 may also perform data comparisons on the selected storage blocks. Data deduplication component 127 may determine based on the comparison whether the storage blocks are duplicates. Guest program 123 is discussed in more detail in regards to FIG. 3 below and may communicate with hypervisor 110 about duplicate storage blocks using one or more indications 129.

Indication 129 may include one or more signals for indicating duplicate storage blocks. In one example, hypervisor 110 may use indication 129 to signal to guest program 123 the storage blocks that should be compared (e.g., storage hints, candidate storage blocks). In another example, guest program 123 may use indication 129 to signal to hypervisor 110 that one or more storage blocks are duplicates. In either example, the signal may be a message, interrupt, notification, exception, trap, instruction (e.g., VMExit), other signal, or a combination thereof. The signal may be initiated by a virtual machine and transmitted to the hypervisor or may be initiated by the hypervisor and transmitted to the virtual machine. In one example, indication 129 may correspond to a system call, hypercall, other function call, or a combination thereof. Indication 129 may be transmitted before, during, or after a candidate storage block or duplicate storage block is identified (e.g., selected or detected) and may be any of the types discussed below.

In one example, indication 129 may be a first type of indication and may be a message that is transmitted from a virtual machine to the hypervisor or hypervisor to virtual machine. The message may correspond to particular set of candidate or duplicate storage blocks and may indicate the one or more storage blocks are candidates that need to be compared if sent by hypervisor or are duplicates if sent by the virtual machine. The message may include identification data (e.g., identifiers) for the one or more storage blocks or storage block ranges. Indication 129 may include a series of indications and each indication in the series may identify an individual storage block or an individual range of storage blocks. In one example, indication 129 may be transmitted by the virtual machine in response to detecting a particular storage block is duplicated and may indicate to the hypervisor that the at least one storage block or storage block pair is a duplicate.

In another example, indication 129 may be a second type that is similar to the first type and may batch multiple different sets of storage blocks. The message may be referred to as a batched message and may include multiple storage blocks that are associated with different sets of storage blocks (e.g., set A corresponds to pattern X and set B corresponds to pattern Y). Batched messages may be advantageous because they may reduce the communications overhead (e.g., I/O or context switches) that occur between virtual machine 120Z and hypervisor 110. Indication 129 may be transmitted in response to a quantity of storage blocks, a quantity of sets, or a combination thereof satisfying one or more threshold values (e.g., at, above, or below threshold value). The threshold value may be a quantity, ratio, percentage, or other value and may be based on a size of the storage (e.g., total storage, allocated storage, unallocated storage, available storage) and may be a particular amount of blocks (e.g., storage block count) or a particular amount of space occupied by the storage blocks (e.g., buffer space limit). The threshold values may include one or more integers, percentages, ratios, other values, or a combination thereof. The values may be relative to the size or limit of storage device 136, storage blocks 126A-Z, processing devices 132A-B, computer system 100, hypervisor 110, virtual machines 120A-Z, guest program 123, heap, page, buffer, other data structure, or a combination thereof.

In yet another example, indication 129 may be a third type that includes one or more signals that correspond to an updated shared data structure representing the status of storage blocks. The shared data structure may be shared between hypervisor 110 and one or more virtual machines 120A-Z and may indicate which storage blocks are candidates, non-candidates, duplicates, non-duplicates, or a combination thereof. Indication 129 may include a first signal that may be sent prior to identifying candidates or duplicates and one or more second signals that may be sent after one or more storage blocks are identified (e.g., candidates selected or duplicates detected). The first signal may be in the form of a message that is transmitted during an initialization of guest program 123 (e.g., guest operating system) or initialization of a particular storage management module of guest program 123. The first signal may be initiated by guest program 123 or hypervisor 110 and may include information (e.g., reference, pointer) for identifying the shared data structure. The shared data structure may represent Guest storage 124A or represents multiple guest storages 124A-B. When guest program 123 detects storage blocks that are duplicates, the virtual machine 120Z may update the shared data structure to indicate to hypervisor 110 that the storage blocks of the other virtual machines includes duplicates. Hypervisor 110 may subsequently access the shared data structure after the duplicate storage blocks are detected. In one example, hypervisor 110 may listen for second signals (e.g., modification events) that indicate the shared data structure has been updated. In another example, hypervisor 110 may or may not listen for second signals and may access the shared data structure responsive to determining storage blocks are needed (e.g., available storage blocks fall below a threshold or storage faults exceed a threshold).

The shared data structure may be modified by one or more of the virtual machines and may be accessible to the hypervisor. The shared data structure may be an array (e.g., bitmap), a linked list, a table, a matrix, other data structure, or a combination thereof. The shared data structure may include an element (e.g., bit flag, entry, or node) for each of the storage blocks and the element may indicate whether the storage block is duplicated, unduplicated, or other state. The shared data structure may be stored in shared storage that may be a portion of guest storage, hypervisor storage, other storage, or a combination thereof. In one example, the shared data structure may be stored in guest storage of virtual machine 120Z. In another example, the shared data structure may be stored in data storage of the hypervisor (e.g., hypervisor storage) and may be temporarily accessible (e.g., mapped) to one or more of the virtual machines. In either example, one or more of the virtual machines and the hypervisor may have access to the shared storage and the shared storage may or may not be encrypted. There may be a single shared data structure that corresponds to one or more groups of virtual machines (e.g., one or more different tenants) or multiple shared data structures that each correspond to a single group of virtual machines (e.g., shared data structure per tenant).

Hardware devices 130 may provide hardware functionality for performing computing tasks related to the data deduplication of storage blocks. Hardware devices 130 may include one or more storage devices 136 and one or more processing devices 132A, 132B, or combination thereof. One or more of these hardware devices may be split up into multiple separate devices or consolidated into one or more hardware devices. Some of the hardware devices shown may be absent from hardware devices 130 and may instead be partially or completely emulated by executable code.

Storage device 136 may include volatile or non-volatile data storage devices. Volatile data storage devices (e.g., non-persistent storage) may store data for any duration of time but may lose the data after a loss of power. Non-volatile data storage devices (e.g., persistent storage) may store data for any duration of time and may retain the data beyond a loss of power. In one example, storage device 136 may include one or more registers (e.g., processor registers) or memory devices (e.g., main memory, auxiliary memory, adapter memory). In another example, storage device 136 may include one or more mass storage devices, such as hard drives (hard disk drive (HDD)), solid-state storage (e.g., Solid State Drives (SSD), flash drive), other data storage devices, or a combination thereof. In a further example, storage device 136 may include a combination of one or more registers, one or more memory devices, one or more mass storage devices, other data storage devices, or a combination thereof that may or may not be arranged in a cache hierarchy.

Processing devices 132A and 132B may include one or more processors that are capable of accessing storage device 136 and executing instructions of guest program 123. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 136. Processing devices 132A-B and storage device 136 may interact with one another to store data in an encrypted form and provide access to the stored data in either an encrypted form or unencrypted form based on the context of the process attempting to access the data (e.g., VM process or hypervisor process).

One or more of the hardware devices 130 may execute a cryptographic function to encrypt or decrypt the data before, during, or after it is stored in storage device 136. The cryptographic function may be any function that is suitable for use in a standardized or proprietary cryptographic protocol and may involve one or more mathematical manipulations of content data. The cryptographic function may map data of an arbitrary size to a bit sequence of a fixed size or variable size. In one example, the cryptographic function may be a cryptographic function that takes a content message as input and outputs a value, which may be referred to as cipher text, a digest, hash, or a message digest. The cryptographic function may include a private key cryptographic function a public key cryptographic function, other cryptographic function, or a combination thereof. In one example, one or more of the hardware devices 130 may execute the cryptographic function without providing higher-level executable code (e.g., guest program 123, guest operating system 122A-B, hypervisor 110, or host operating system) access to the cryptographic function, cryptographic input, or a combination thereof. This is advantageous because it may reduce access to the cryptographic keys and unencrypted data, which may enhance security.

In one example, the cryptographic function may be an "in-place" cryptographic function that may avoid copying data of a storage block to another location during the execution of the cryptographic function (e.g., during data encryption or decryption). The in-place cryptographic function may transform data within a storage block of the storage device without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data. In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be O (log n), O (n), or other portion of "n", wherein "n" is the number of bits or bytes of the unencrypted content data. In any of the above example, the cryptographic function may encrypt or decrypt data using cryptographic input (e.g., one or more cryptographic keys).

The cryptographic input may be any cryptographic bit sequence and may include encryption keys, decryption keys, public keys, private keys, symmetric keys, asymmetric keys, other cryptographic data, or a combination thereof. The cryptographic input may include or be generated or derived from one or more initialization vectors, starting variables, other data, or a combination thereof. The cryptographic input may include or be based on the spatial data, temporal data, or contextual data as discussed in more detail below. In one example, the cryptographic input may include a location dependent cryptographic input that includes a bit sequence based on spatial data that is specific to one or more storage blocks, storage devices, processing devices, other hardware devices, or combination thereof. For example, cryptographic input may be based on data that is permanently or temporarily associated with the hardware device, such as hardware identification information or a physical memory address of a particular physical storage block (e.g., host memory frame or disk sector). The latter example may cause each storage block to be associated with different cryptographic input and therefore cause the cipher text of identical content to be different after it is encrypted.

The cryptographic input used to encrypt or decrypt data is accessible to the hardware device performing the cryptographic function and may or may not be accessible to one or more of the programs (e.g., guest program 123, guest operating systems 122A-B, hypervisor 110, or host operating system). In one example, the cryptographic input may be a cryptographic key that functions as an encryption key, a decryption key, or a combination thereof and the key may be accessible to a hardware device without being accessible to any of the programs. The programs may or may not provide cryptographic input to the hardware to derive the cryptographic key and the program may be unable to derive the cryptographic key in the absence of the hardware device or using a different hardware device. In another example, one or more of the cryptographic keys may be accessible to a program executed by the virtual machine (e.g., guest program 123 or guest operating systems 122A-B) without being accessible to the hypervisor 110. In yet another example, the hypervisor may have access to a cryptographic key to encrypt the data without having access to a cryptographic key to decrypt the data (e.g., access to encryption key but not decryption key.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
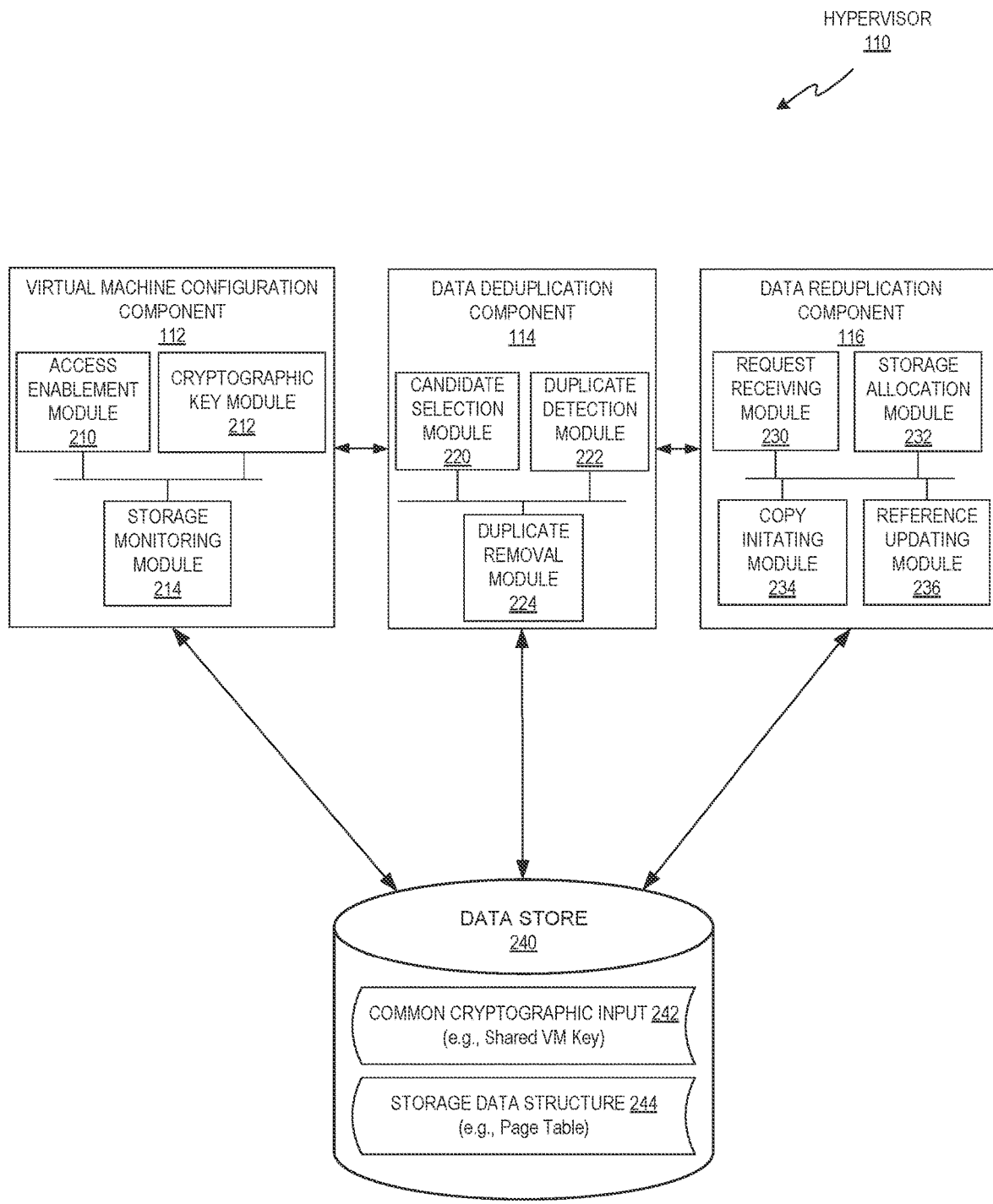
FIG. 2 depicts a block diagram illustrating components and modules of an example hypervisor (e.g., a virtual machine monitor), in accordance with one or more aspects of the present disclosure.

FIG. 2 is a block diagram illustrating example components and modules of hypervisor 110, in accordance with one or more aspects of the present disclosure. Hypervisor 110 may include a virtual machine configuration component 112, a data deduplication component 114, and a data reduplication component 116.

Virtual machine configuration component 112 may enable hypervisor 110 to configure a virtual machine to access data storage of one or more other virtual machines. The data storage may be encrypted data storage that is accessible to the virtual machines without being accessible to the hypervisor managing the virtual machines. In one example, virtual machine configuration component 112 may include an access enablement module 210, a cryptographic key module 212, and a storage monitoring module 214.

Access enablement module 210 may enable the hypervisor to provide the guest program with access to guest storage of multiple different virtual machines. Hypervisors often configure virtual machines to be isolated from one another so that a process executed by a first virtual machine does not have access to guest storage of a second virtual machine. Access enablement module 210 may enable hypervisor 110 to configure a first virtual machine to access guest storage of multiple virtual machines by executing one or more operations to map, mount, link, designate, assign, associate, connect, or other operation that enables access to the guest storage of other virtual machines. In one example, hypervisor may designate a portion of hypervisor storage as guest storage and may map the portion into multiple different virtual machines. Mapping the guest storage into the respective virtual machines may occur at different times and the guest storage may be associated with a first virtual machine when the first virtual machine is instantiated and may be associated with a second virtual machine before, during, or after the second virtual machine is instantiated. For example, the hypervisor may modify access of the second virtual machine to the guest storage of the first virtual machine in response to the activation or deactivation of the guest program or virtual machine as discussed below.

Cryptographic key module 212 may enable hypervisor 110 to configure a virtual machine so that the virtual machine is associated with a cryptographic key for accessing guest storage of one or more other virtual machines. The cryptographic key may be the same key used by the other virtual machines or may be a different key (e.g., mathematically related or derived key). The cryptographic key may be associated with the virtual machine in any manner that enables the hardware device to retrieve and use the key when the virtual machine attempts to read or write to the guest storage of another virtual machine. Associating the cryptographic key with the virtual machine may involve storing, copying, linking, updating, transforming, or other operation on a key associated with the other virtual machine, the hypervisor, or an entity using the virtual machine. The cryptographic key may be associated with the virtual machine with or without being accessible to the virtual machine. For example, the cryptographic key may be stored in a particular storage location that can be accessed by a hardware device executing the cryptographic function but may not be accessible to a process executed by the virtual machine. As discussed above, the cryptographic function may use the cryptographic key in combination with one or more other cryptographic input (e.g., location based input). The cryptographic key used by the virtual machine may be the same or similar to common cryptographic input 242.

Common cryptographic input 242 may be used to encrypt or decrypt data and may not be specific to individual storage blocks as was discussed in regards to the location dependent cryptographic input. For example, common cryptographic input 242 may be a cryptographic key for a particular virtual machine and used to encrypt or decrypt some or all of the storage blocks associated with the particular virtual machine. In one example, common cryptographic input 242 may be a shared cryptographic key that is shared by multiple virtual machines associated with an entity (e.g., all VMs of a tenant/consumer/client). In another example, common cryptographic input 242 may include multiple different shared keys (e.g., a key chain) and each of the keys may correspond to a particular one of the virtual machines. In either example, guest program 123 may have access to common cryptographic input 242 and use the common cryptographic input 242 to access storage blocks in guest storage.

Common cryptographic input 242 (e.g., shared key) may be used individually or in combination with the location dependent cryptographic input to create or derive the one or more encryption keys or decryption keys used by the hardware device. In one example, the common cryptographic input 242 is accessible to the virtual machine but the encryption key and/or decryption key that is used by the hardware device may be inaccessible to some or all higher-level programs (e.g., hypervisor, guest operating system, guest program). In other examples, common cryptographic input 242 may be based on the spatial, temporal, or contextual data.

Storage monitoring module 214 may enable hypervisor 110 to monitor the availability of data storage for the virtual machines, hypervisor, host operating system, other program, or a combination thereof. Storage monitoring module 214 may determine the availability of the data storage in view of one or more attributes of the data storage. The attributes of the data storage may be based on the quantity and/or availability of the data storage. The availability of the data storage may correspond to whether data storage is or is not allocated (e.g., designated, assigned), initialized (e.g., initiated, populated with default value), resident (e.g., paged out/in, swapped out/in), in use, or a combination thereof. The quantity of data storage may correspond to the total quantity of data storage or the quantity of data storage associated with a particular state (e.g., quantity available for use).

The attributes may correspond to the availability of data storage at one or more levels. The levels may include a physical data storage level (e.g., storage device availability), virtual machine data storage level (e.g., guest storage availability), hypervisor data storage level (hypervisor storage availability), other data storage level, or a combination hereof. Storage monitoring module 214 may monitor the availability of data storage at a particular level and compare the availability with one or more thresholds.

The one or more thresholds may be data values or ranges of values that when satisfied cause the hypervisor to activate or deactivate data deduplication. Determining whether a threshold is satisfied may involve one or more comparisons to determine an attribute (e.g., available memory) is at (e.g, equal to), above (e.g., greater than, exceeds), or below (e.g., less than) the threshold. The data values may include one or more integers, ratios, percentages, or other value and may be based on a size of the storage (e.g., total storage, allocated storage, unallocated storage, available storage), amount of storage blocks (e.g., storage block count), or amount of space occupied by the storage blocks (e.g., buffer space limit). The values may be relative to the size or limit of storage devices, storage blocks, processing devices, hypervisor, virtual machines, guest program, heap, page, buffer, other data structure, or a combination thereof.

Multiple thresholds may be used to regulate the activation and deactivation of the data deduplication. For example, there may be a first threshold for determining when to activate the data deduplication and a second threshold for determining when to deactivate the data deduplication. Storage monitoring module 214 may continuously or discretely monitor the quantity of data storage available to hypervisor 110 and compare it to the first or second thresholds. In one example, the quantity of data storage available to hypervisor 110 may be based on the total quantity of data storage accessible to the hypervisor minus the amount in use by the virtual machines and hypervisor. The quantity may then be compared to the first threshold (e.g., activation threshold) and if the quantity satisfies the threshold (e.g., memory use above 90%, memory availability below 10%) hypervisor 110 may activate the data deduplication. After activating the data deduplication, hypervisor 110 may compare the quantity to the second threshold (e.g., deactivation threshold) and if the quantity satisfies the threshold (memory use below 80%, memory availability above 20%) hypervisor 110 may deactivate the data deduplication.

Data deduplication component 114 may enable hypervisor 110 to perform data deduplication on encrypted data storage of one or more virtual machines to remove some or all of the duplicate content. Data deduplication component 114 may interact with guest program 123, which is discussed in more detail below in regards to FIG. 3. In one example, data deduplication component 114 may include a candidate selection module 220, a duplicate detection module 222, and a duplicate removal module 224.

Candidate selection module 220 enables hypervisor 110 to select a set of candidate storage blocks that may be compared by the guest program to identify duplicate storage blocks. Candidate selection module 220 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address, guest physical address) or physical locations (e.g., host physical address) of the storage block. The contextual data may be any data that provides a context of a storage block or content within the storage block and may indicate a particular thread, process, user, host, virtual machine, or a combination thereof is associated with a specific storage block. The data associated with the storage blocks may be determined by hypervisor 110 by accessing, scanning, searching, or monitoring the storage blocks or may be received from a hypervisor or host operating system (e.g., hypervisor hints). In one example, candidate selection module 220 may select the storage blocks in view of a heuristic that uses modification times of storage blocks.

Candidate selection module 220 may calculate a similarity score by analyzing and/or weighting the temporal data, spatial data, or contextual data associated with the storage blocks. The similarity score may be a probabilistic value that indicates the probability that separate storage blocks or groups of storage blocks include the same or similar content data. The probabilistic value may be represented in any form such as decimals, fractions, percentages, integers, ratios, other forms, or combination thereof. Candidate selection module 220 may select one or more storage blocks in view of the similarity score. For example, candidate selection module 220 may select one or more storage blocks that exceed (e.g., above or below) a predetermined threshold. Candidate selection module 220 may identify particular storage blocks or groups of storage blocks and may add them to a set of candidate storage blocks.

Duplicate detection module 222 may enable hypervisor 110 to interact with the guest program to detect duplicate storage blocks. In one example, hypervisor 110 may provide the guest program with the set of candidate storage blocks to be compared. In another example, hypervisor 110 may not provide the guest program with the set storage blocks to be compared and the guest program will select which storage blocks to compare as discussed below in regards to FIG. 3. In either example, the comparison of storage blocks may be performed by the guest program and the hypervisor may receive an indication from the guest program that one or more storage blocks are duplicate storage blocks. As discussed above, hypervisor 110 may receive the indication in response to the guest program making a hypercall and the hypercall may indicate the one or more locations (e.g., guest physical addresses) of the duplicate storage blocks.

Duplicate removal module 224 may enable hypervisor 110 to update the duplicate storage blocks to reference a common storage location. In one example, updating the duplicate storage blocks may involve updating the second storage block to reference a physical storage location of the first storage block. Updating a reference may involve modifying a storage data structure 244 to remove one or more duplicate storage blocks. Storage data structure 244 may include one or more references that correspond to one or more storage blocks. Each reference may correspond to (e.g., point to) the beginning, middle, end, or other portion of the one or more physical storage blocks (e.g., memory frames). When a first storage block and a second storage block are determined to be duplicates, duplicate removal module 224 may update the storage data structure 244 to change a reference to the first storage block to subsequently reference the second storage block. As a result, the references for the first storage block and the second storage block may point to the identical content of the storage block (i.e., second storage block content). This may effectively remove the first block by de-referencing the first storage block so that it can be subsequently reused, reallocated, flushed, wiped, or other action.

Storage data structure 244 may be a memory cache data structure or it may be another storage data structure that corresponds to a caching system, a file system, a database system, other storage system, or a combination thereof. In one example, storage data structure 244 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After receiving an indication of the duplicates, duplicate removal module 224 may update the memory cache data structure by invalidating the pointer entries for one or more of the duplicate storage blocks and may flush the address-translation cache to remove references to or the content of the duplicates.

Data reduplication component 116 may enable data that was deduplicated to be reduplicated for subsequent modification. When data is deduplicated it may be consolidated into one or more storage blocks that are unmodifiable (e.g., read-only, write protected) and data reduplication component 116 may duplicate the data to enable the storage blocks to be modified independent of one another. In one example, data reduplication component 116 may include a request receiving module 230, a storage allocation module 232, a copy initiating module 234, and a reference updating module 236.

Request receiving module 230 may receive an indication that a virtual machine is requesting to modify a storage block that was consolidated during a de-duplication process. The request may correspond to storage block identification data, modification data, other data, or a combination thereof. The storage block identification data may be used to determine one or more storage blocks that correspond to references to a common storage location. The modification data may identify an operation or instruction that initiated the modification and the original or modified data. The request may be received by a processing device and may cause a hypervisor to be initiated (e.g., context switch from VM to hypervisor).

Storage allocation module 232 may allocate data storage to store a new copy of the encrypted data. The encrypted data may be stored at a first storage location and storage allocation module 232 may allocate storage at a second storage location. The first and second storage locations may be logical locations or physical locations that are on the same storage device or on different storage devices. In one example, the first storage location may be associated with a first memory block (e.g., first memory page) and the second storage location may be associated with a second memory block (e.g., second memory page). The first and second memory blocks may be on the same or different memory devices. The different memory devices may be memory devices that were or were not manufactured separately and may be associated with the same caching level (e.g., main memory) of a cache hierarchy.

Copy initiating module 234 may enable hypervisor 110 to cause the guest program to copy the data of the encrypted storage block to the newly allocated or previously allocated second storage location. The data may be encrypted with location dependent cryptographic input and the hypervisor 110 may not have access to a decrypted version of the data. If the hypervisor were to copy over the encrypted data it may become inaccessible because the key corresponding to the new location may be unable to successfully decrypt the data. To overcome this, hypervisor 110 may instruct the guest program to perform the data copy. The data copy operation may copy data of a storage block between storage locations and may involve copying digital content of the entire storage block or just a portion of the storage block. The copying may be performed by the guest program without exposing the decrypted content to the hypervisor that initiated the data copying operation. Copying a storage block may involve copying digital content of one or more storage blocks to a new location and may involve a copy operation, a migrate operation, a move operation, other operation, or a combination thereof. In one example, the copy may involve physically manipulating the bits at the new location. In another example, the copying may involve an operation that manipulates one or more pointers without physically manipulating the bits of the storage block at the original or new locations. For example, that may involve re-referencing a storage block that was previously dereferenced. In yet another example, the copying or subsequent steps of the migration may involve a combination of manipulating physical bits and references to the physical bits. The references (e.g., pointers) may be stored in storage data structure 244.

Reference updating module 236 may be the same or similar to duplicate removal module 224 but may perform tasks to reduplicate a previously deduplicated storage block. Reference updating module 236 may update storage data structure 244 to update a reference that points to the original storage block to subsequently point to the new storage block. This may be advantageous because the original storage block may comprise read-only data (e.g., deduplicated data) and the new storage block may comprise data that is modifiable (e.g., reduplicated data). When the storage blocks are portions of memory (e.g., memory pages), reference updating module 236 may update multiple separate storage data structures corresponding to the virtual machine, hypervisor, or host operating system. For example, there may be a first storage data structure that corresponds to the host memory and is maintained by the hypervisor and there may be a second storage data structure that corresponds to guest memory of the virtual machine and is maintained by the virtual machine. The host memory may correspond to physical memory (e.g., main memory) of the host and the guest memory may correspond to what appears to the virtual machine as its portion of physical memory (e.g., guest physical memory).

Figure 3:
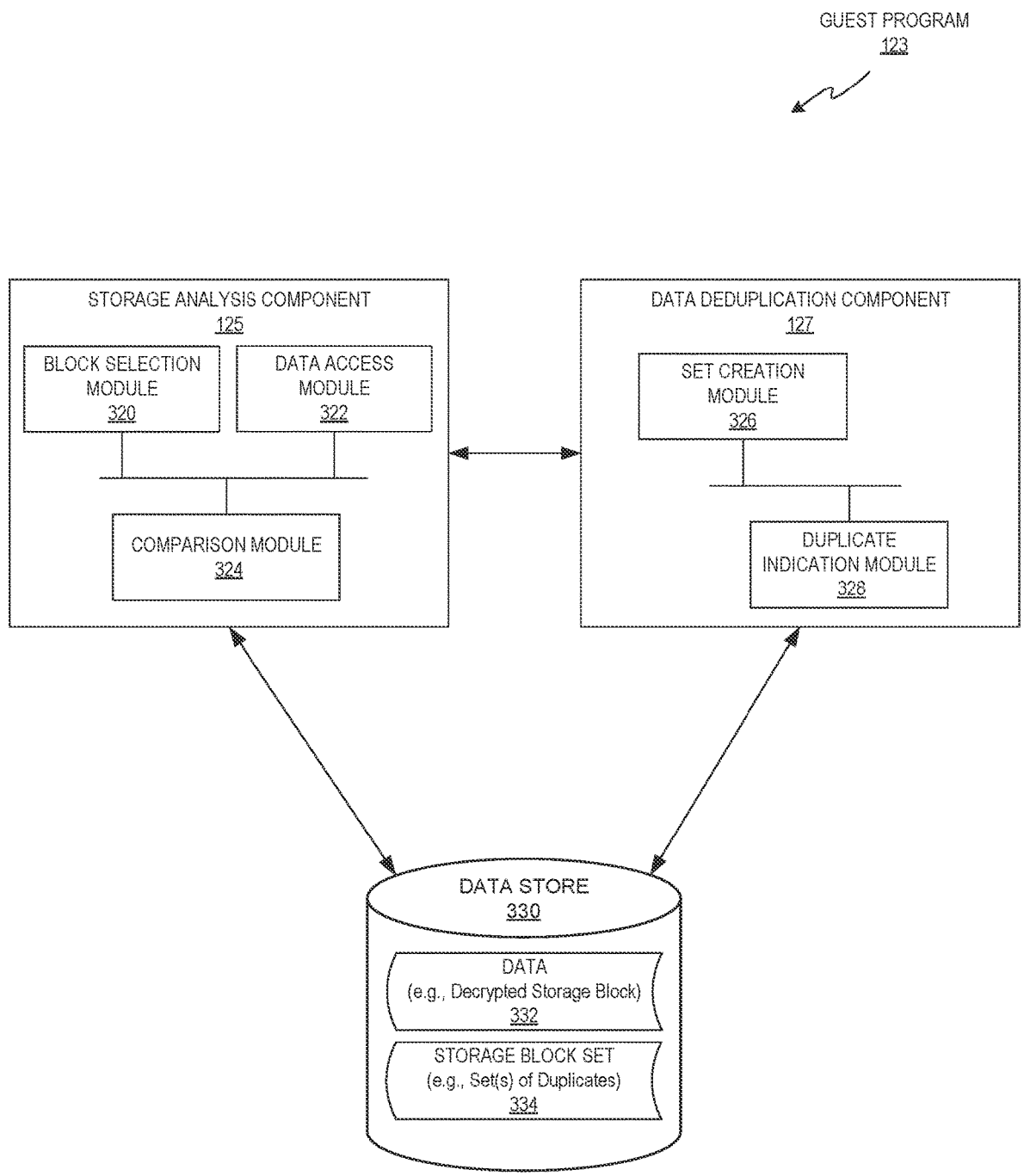
FIG. 3 depicts a block diagram illustrating components and modules of an example guest program (e.g., a guest operating system, driver, or executable code) that is executed by a virtual machine, in accordance with one or more aspects of the present disclosure.

FIG. 3 is a block diagram illustrating example components and modules of guest program 123, in accordance with one or more aspects of the present disclosure. As discussed above, guest program 123 may be executable code and may or may not be part of a full operating system, a lightweight operating system, or a standalone kernel (e.g., micro-kernel, just enough Operation System (JeOS)). Guest program 123 may be executed by a virtual machine in a mode or space associated with the virtual machine (e.g., one or more virtual machine processes). The virtual machine may be configured to enable guest program 123 to access storage resources of another virtual machine. In the example shown, guest program 123 may include a storage analysis component 125 and a data deduplication component 127.

Storage analysis component 125 may enable guest program 123 to analyze data storage to identify portions of the data storage that contain duplicate data. The data storage may be accessible to a virtual machine executing the guest program and may be assigned and in use by other virtual machines. Storage analysis component 125 may include a block selection module 320, data access module 322, and a comparison module 324.

Block selection module 320 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address, guest physical address) or physical locations (e.g., host physical address) of the storage block. The contextual data may be any data that provides a context of a storage block or content within the storage block and may indicate a particular thread, process, user, host, virtual machine, or a combination thereof is associated with a specific storage block. The data associated with the storage blocks may be determined by guest program 123 by accessing, scanning, searching, or monitoring the storage blocks or may be received from a hypervisor or host operating system (e.g., hypervisor hints).

Block selection module 320 may calculate a similarity score by analyzing and/or weighting the temporal data, spatial data, or contextual data associated with the storage blocks. The similarity score may be a probabilistic value that indicates the probability that separate storage blocks or groups of storage blocks include the same or similar content data. The probabilistic value may be represented in any form such as decimals, fractions, percentages, integers, ratios, other forms, or combination thereof. Block selection module 320 may select one or more storage blocks in view of the similarity score. For example, block selection module 320 may select one or more storage blocks that exceed (e.g., above or below) a predetermined threshold. Block selection module 320 may identify particular storage blocks or groups of storage blocks and may add them to a set of candidate storage blocks.

Data access module 322 may enable guest program 123 to access data of the selected storage blocks. The data of a selected storage block may include data stored internal to the storage block and/or data that is stored external to the storage block. The data stored external to the storage block may be associated with the storage block and used for managing or organizing storage blocks (e.g., metadata, time data, dirty data, fingerprint data). Data access module 322 may access the data of the storage blocks so that the storage blocks can be compared to identify duplicate data. As discussed above, the storage blocks may be encrypted using different cryptographic input and this may cause storage blocks that have identical unencrypted versions of data to have different encrypted versions of the data. Data access module 322 may enable guest program 123 to request access to the storage blocks in the context of the virtual machine (as opposed to hypervisor) to ensure that the data being accessed is decrypted before being access by comparison module 324.

Comparison module 324 may enable guest program 123 to perform one or more comparisons of unencrypted data from different storage blocks (e.g., data 332). When comparing the content data of a storage block, not all of the data may need to be compared because some of the data within a storage block may be extraneous data (e.g., padding or unoccupied). Therefore, storage blocks with similar but non-identical content may still be determined to have equivalent data and be identified as duplicate storage blocks because they contain at least some identical content. In one example, comparison module 324 may directly compare the data of a storage block with the data of one or more other storage blocks. In another example, comparison module 324 may indirectly compare different storage blocks by comparing data representative of the data in the storage blocks. The representative data may be a hash of the decrypted content or a hash of one or more portions of the decrypted data of the storage blocks (e.g., just beginning or end portions).

Data deduplication component 127 may enable guest program 123 to interact with a hypervisor or host operating system to remove some or all of the duplicate content. In the example shown in FIG. 2, data deduplication component 127 may include a set creation module 326 and a duplicate indication module 328.

Set creation module 326 may enable guest program 123 to add duplicate storage blocks to a storage block set 334. Storage block set 334 may be a data structure that includes one or more lists, tables, matrices, arrays, pointers, ranges, values, flags, other data structures, or a combination thereof. Storage block set 334 may be generated by guest program 123 and stored in data store 330 or may be generated by another program (e.g., hypervisor) and shared with guest program 123 as discussed above (e.g., shared data structure). Set creation module 326 may access and update storage block set 334 to add one or more storage blocks that have duplicate content. Adding the storage blocks may involve adding identification data for the storage block to the storage block set 334. The identification data may include identification data of the storage blocks (e.g., storage identifier, storage address, offset), the virtual machines (e.g., VM ID, process ID, owner), the storage devices, the duplicated data (e.g., bit pattern), other data, or a combination thereof. In one example, storage block set 334 may correspond to a particular instance of duplicate storage blocks and all blocks in the set may be a duplicate of one another. In another example, storage block set 334 may correspond to multiple different instances of duplicates storage blocks and each instance of duplicates may be referred to as a duplicate subset. In either example, the one or more storage block sets 334 may be provided to a hypervisor using duplicate indication module 328.

Duplicate indication module 328 may enable guest program 123 to provide an indication to the hypervisor that indicates the multiple virtual machines include duplicate storage blocks. As discussed above, the indication may be any message or signal that indicates the existence of duplicate storage blocks and may or may not identify one or more of the storage blocks that are duplicates. Duplicate indication module 328 may provide the indication by transmitting the identification data of storage block set 334 to the hypervisor or by providing an indication that references a shared storage block set 334 that has been updated. The shared storage block set 334 may be stored in shared storage that is accessible by both the virtual machine executing the guest program 123 and by the hypervisor. In one example, duplicate indication module 328 may provide an indication to the hypervisor by initiating a hypercall. In another example, duplicate indication module 328 may provide the indication by updating a particular storage location (e.g., shared data structure).

Providing the indication of the duplicate storage blocks is discussed in detail in regards to FIG. 1 (e.g., indication 129) and may cause the hypervisor to deduplicate the storage blocks. The hypervisor may deduplicate the storage blocks by updating one or more storage structures to remove one or more of the duplicate storage blocks. The storage structure may include one or more references that correspond to the one or more duplicate storage blocks. Each reference may identify (e.g., point to) the beginning, middle, end, or other portion of the one or more storage blocks. When a first storage block and a second storage block are determined to be duplicates, the hypervisor or guest program may update the storage structure to change a reference for the first storage block to subsequently reference the same location as the second storage block. As a result, the references for the first storage block and the second storage block may point to a common storage location. This may free the first block by de-referencing the first storage block so that it can be subsequently reused, reallocated, removed, flushed, wiped, or other action.

The storage structure modified by the hypervisor in view of the guest program indication may be a memory cache data structure or it may be another storage structure that corresponds to a caching system, a file system, a database system, other storage system, or a combination thereof. In one example, the storage structure may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After detecting duplicates, duplicate indication module 328 may transmit an indication that causes hypervisor 110 to update the memory cache data structure by invalidating the pointer entries for one or more of the duplicate storage blocks and may flush the address-translation cache to remove references to or the content of the duplicates.

Figure 4:
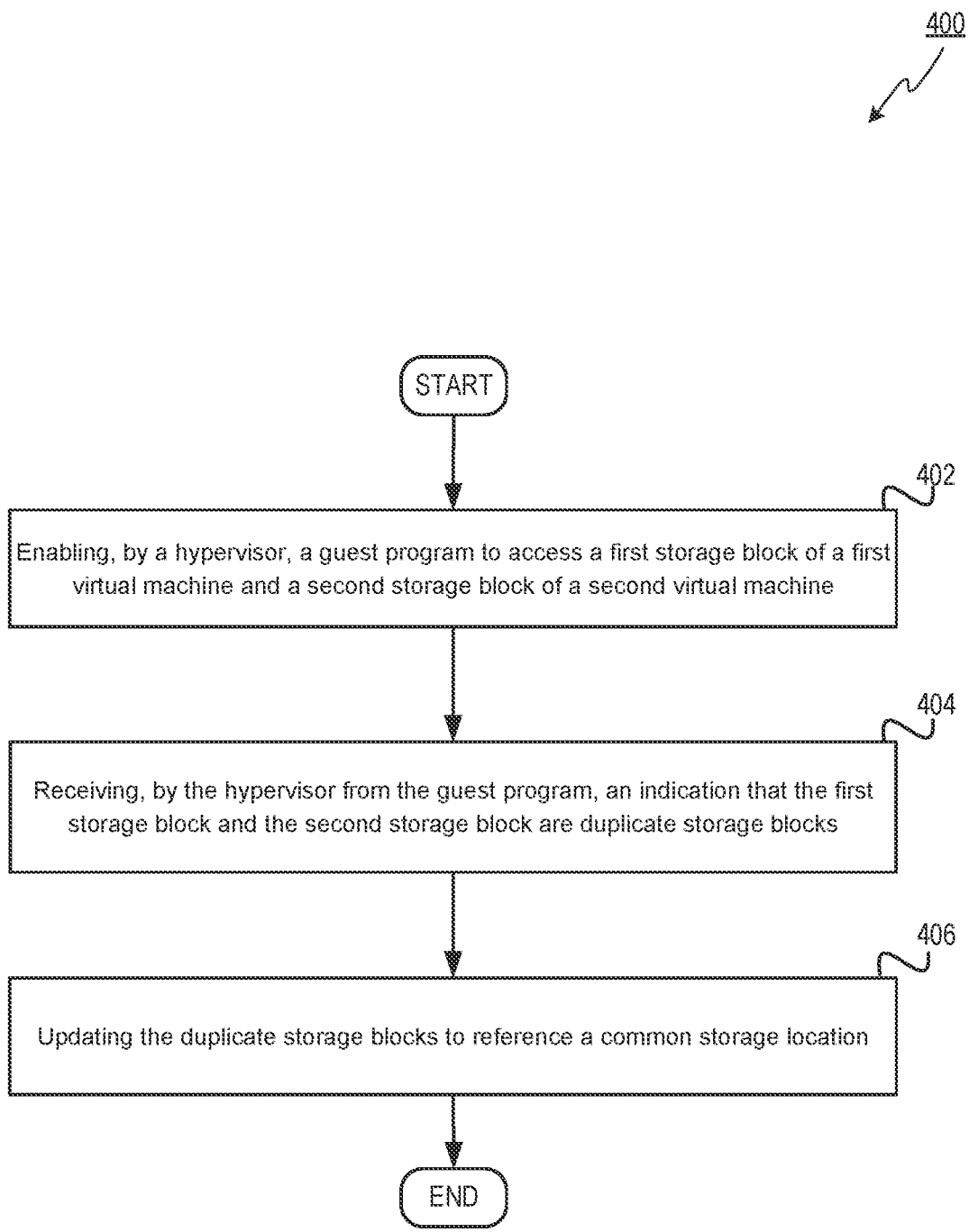
FIG. 4 depicts a flow diagram of an example method that enables a hypervisor to perform data deduplication on encrypted data storage of one or more virtual machines, in accordance with one or more aspects of the present disclosure.

FIG. 4 depicts a flow diagram of an illustrative example of a method 400 that enables a hypervisor to perform data deduplication on the encrypted data storage of one or more virtual machines, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a hypervisor executing on a host machine as shown in FIG. 1.

Method 400 may be performed by processing devices of a server device or a client device and may begin at block 402. At block 402, the hypervisor may enable a guest program to access a first storage block of a first virtual machine and a second storage block of a second virtual machine. The first storage block and the second storage block may include data that is encrypted and/or decrypted by a hardware device using cryptographic keys that are inaccessible to the hypervisor. Each of the cryptographic keys may be based on a common cryptographic input shared by multiple virtual machines (e.g., shared key part) and a location dependent cryptographic input (e.g., location dependent key part). In one example, the guest program may be executed by the first virtual machine and the first and second virtual machines may share a common cryptographic input for encrypting and/or decrypting the data of the first and second storage blocks. In another example, the guest program may be executed by a third virtual machine and the first, second, and third virtual machines may share a common cryptographic input for encrypting and/or decrypting the data of the first and second storage blocks. In either example, the guest program may be activated by the hypervisor in response to the hypervisor detecting that a quantity of available physical data storage is below a threshold value (below 10% availability) and may be deactivated in response to the hypervisor detecting that the quantity of available physical data storage is above a threshold value (e.g., above 25% availability).

In one example, enabling the guest program may involve the hypervisor activating a lean virtual machine that executes the guest program without executing a full guest operating system. The hypervisor may update the lean virtual machine to associate it with the common cryptographic input of the first virtual machine and the second virtual machine. The hypervisor may configure the lean virtual machine to access storage (e.g., memory) of the first and second virtual machines by mapping the first storage device and the second storage device into guest storage of the third virtual machine.

At block 404, the hypervisor may receive an indication from the guest program that the first storage block and the second storage block are duplicate storage blocks. The indication may be initiated by the guest program by making a hypercall to the hypervisor and the hypercall may indicate one or more guest physical addresses of the duplicate storage blocks. The duplicate storage blocks may include equivalent data that is encrypted with different location dependent cryptographic input when stored in a storage device. The different location dependent cryptographic input corresponds to different host physical addresses for the first and second storage blocks. The encrypted data may be accessible to the guest program in a decrypted form and is inaccessible to the hypervisor in the decrypted form. This may enable the first and second storage blocks to be compared by the guest program but not the hypervisor. In one example, the first and second storage blocks may be selected by the guest program and then compared. In another example, the first and second storage blocks may be selected by the hypervisor and compared by the guest program. In the latter example, the hypervisor may have added the first and second storage blocks to a set of candidate storage blocks and provide the set to the guest program. In either example, the selection may be in view of a heuristic that uses modification times of storage blocks.

At block 406, the processing device may update the duplicate storage blocks to reference a common storage location. Updating the duplicate storage blocks may involve updating the second storage block to reference a physical storage location of the first storage block. In one example, the duplicate storage blocks may correspond to duplicate pages in physical memory and the update may remove one of the duplicate pages from physical memory by associating both storage blocks with the same location in physical memory (e.g., common host memory location). Responsive to completing the operations described herein above with references to block 406, the method may terminate.

Figure 5:
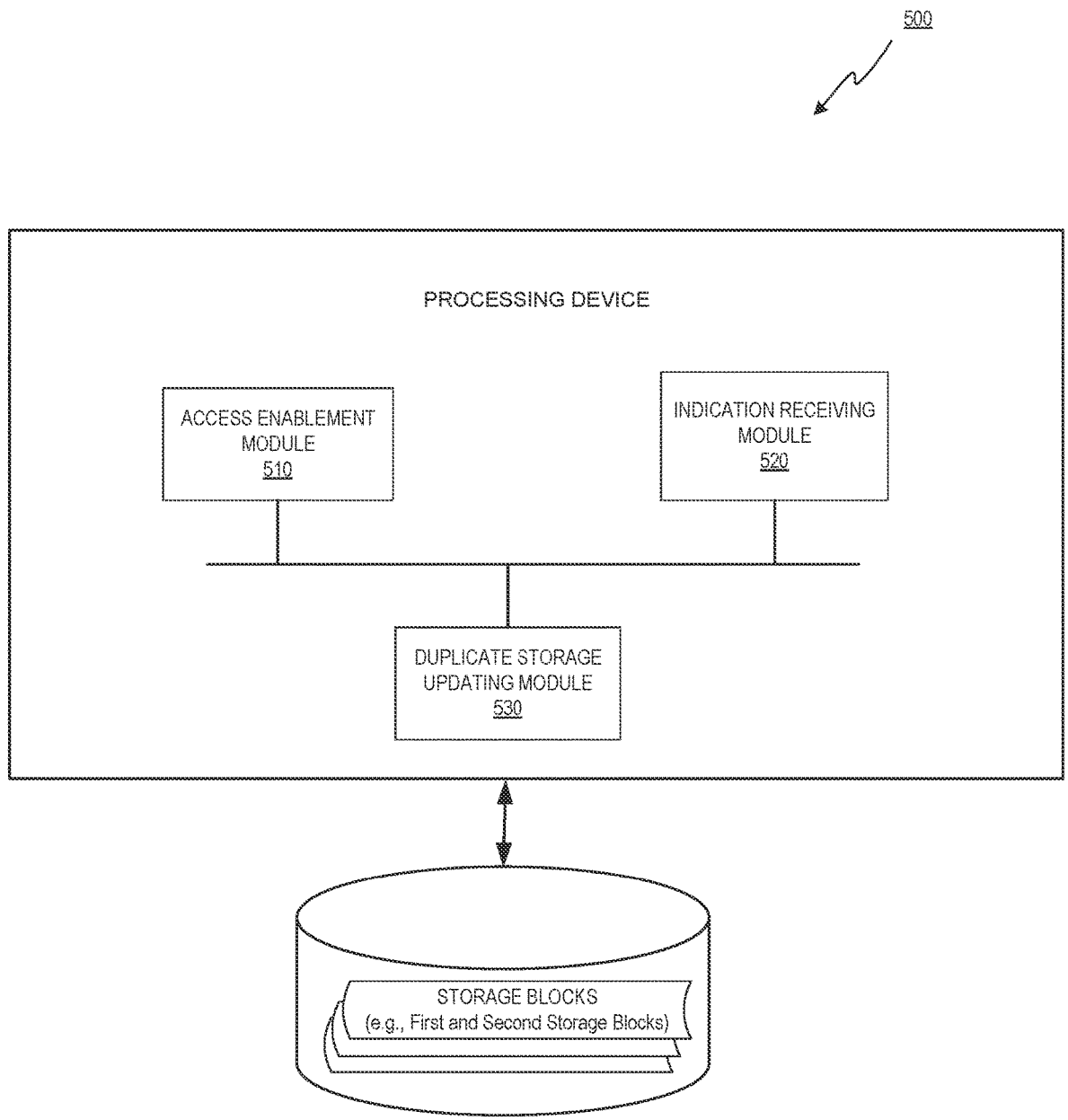
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 100 of FIG. 1 or computer system 700 of FIG. 7 and may include one or more processing devices and one or more memory devices. In the example shown, computer system 500 may include an access enablement module 510, an indication receiving module 520, and duplicate storage updating module 530.

Access enablement module 510 may cause the hypervisor to enable a guest program to access a first storage block of a first virtual machine and a second storage block of a second virtual machine. The first storage block and the second storage block may include data that is encrypted and/or decrypted by a hardware device using cryptographic keys that are inaccessible to the hypervisor. Each of the cryptographic keys may be based on a common cryptographic input shared by multiple virtual machines (e.g., shared key part) and a location dependent cryptographic input (e.g., location dependent key part). In one example, the guest program may be executed by the first virtual machine and the first and second virtual machines may share a common cryptographic input for encrypting and/or decrypting the data of the first and second storage blocks. In another example, the guest program may be executed by a third virtual machine and the first, second, and third virtual machines may share a common cryptographic input for encrypting and/or decrypting the data of the first and second storage blocks. In either example, the guest program may be activated by the hypervisor in response to the hypervisor detecting that a quantity of available physical data storage is below a threshold value (below 10% availability) and may be deactivated in response to the hypervisor detecting that the quantity of available physical data storage is above a threshold value (e.g., above 25% availability).

In one example, enabling the guest program may involve the hypervisor activating a lean virtual machine that executes the guest program without executing a full guest operating system. The hypervisor may update the lean virtual machine to associate it with the common cryptographic input of the first virtual machine and the second virtual machine. The hypervisor may configure the lean virtual machine to access storage (e.g., memory) of the first and second virtual machines by mapping the first storage device and the second storage device into guest storage of the third virtual machine.

Indication receiving module 520 may enable the processing device to execute the hypervisor and receive an indication from the guest program that the first storage block and the second storage block are duplicate storage blocks. The indication may be initiated by the guest program by making a hypercall to the hypervisor and the hypercall may indicate one or more guest physical addresses of the duplicate storage blocks. The duplicate storage blocks may include equivalent data that is encrypted with different location dependent cryptographic input when stored in a storage device. The different location dependent cryptographic input corresponds to different host physical addresses for the first and second storage blocks. The encrypted data may be accessible to the guest program in a decrypted form and is inaccessible to the hypervisor in the decrypted form. This may enable the first and second storage blocks to be compared by the guest program but not the hypervisor. In one example, the first and second storage blocks may be selected by the guest program and then compared. In another example, the first and second storage blocks may be selected by the hypervisor and compared by the guest program. In the latter example, the hypervisor may have added the first and second storage blocks to a set of candidate storage blocks and provide the set to the guest program. In either example, the selection may be in view of a heuristic that uses modification times of storage blocks.

Duplicate storage updating module 530 may enable the processing device to update the duplicate storage blocks to reference a common storage location. Updating the duplicate storage blocks may involve updating the second storage block to reference a physical storage location of the first storage block. In one example, the duplicate storage blocks may correspond to duplicate pages in physical memory and the update may remove one of the duplicate pages from physical memory by associating both storage blocks with the same location in physical memory (e.g., common host memory location).

Figure 6:
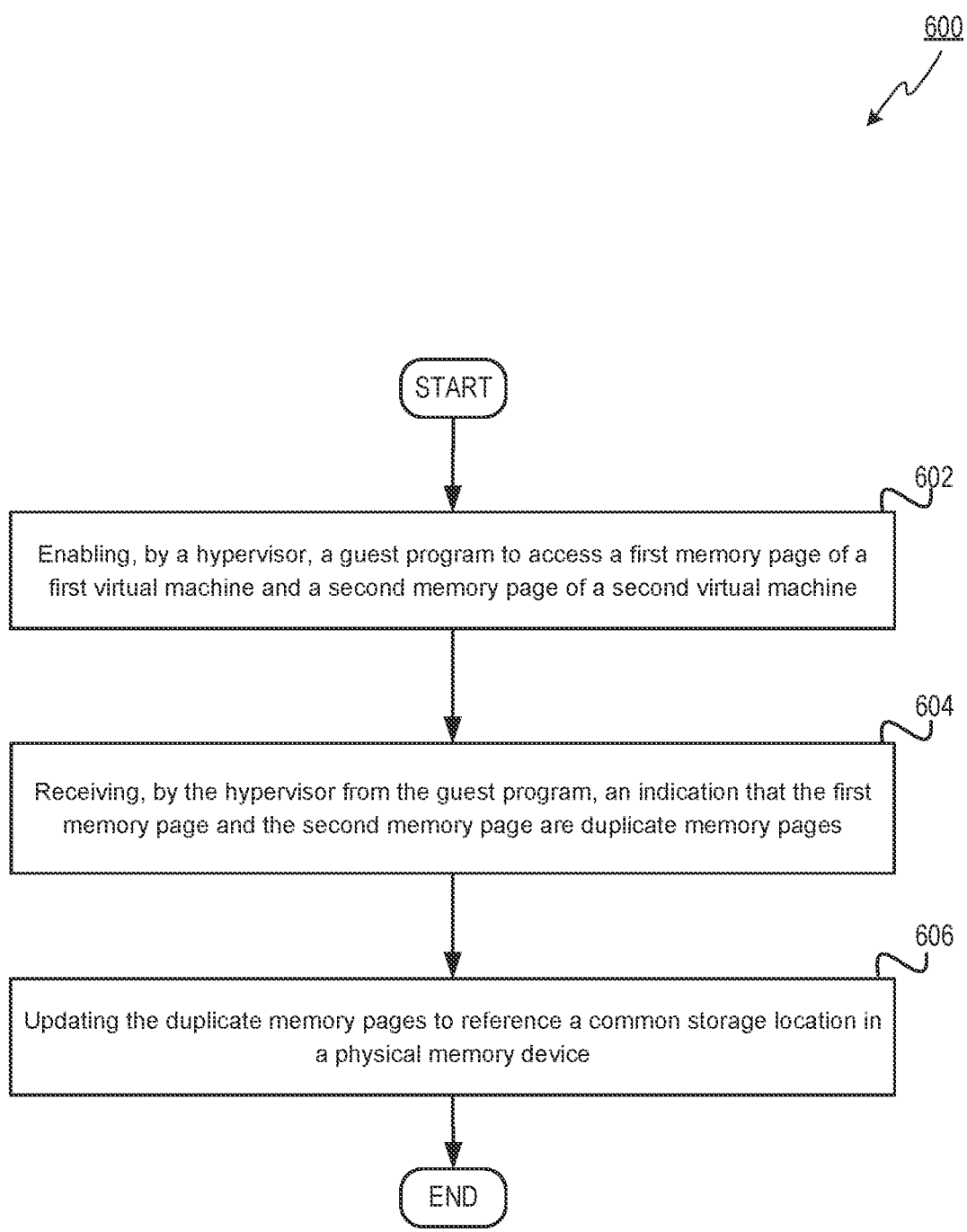
FIG. 6 depicts a flow diagram of an example method that enables a hypervisor to perform data deduplication on encrypted memory of one or more virtual machines, in accordance with one or more aspects of the present disclosure.

FIG. 6 depicts a flow diagram of one illustrative example of a method 600 for performing data deduplication of a storage device while the data on the storage device is encrypted, in accordance with one or more aspects of the present disclosure. Method 600 may be similar to method 300 and may be performed in the same or a similar manner as described above in regards to method 300. Method 600 may be performed by processing devices of a server device or a client device and may begin at block 602.

At block 602, the hypervisor may enable a guest program to access a first memory page of a first virtual machine and a second memory page of a second virtual machine. The first memory page and the second memory page may include data that is encrypted and/or decrypted by a hardware device using cryptographic keys that are inaccessible to the hypervisor. Each of the cryptographic keys may be based on a common cryptographic input shared by multiple virtual machines (e.g., shared key part) and a location dependent cryptographic input (e.g., location dependent key part). In one example, the guest program may be executed by the first virtual machine and the first and second virtual machines may share a common cryptographic input for encrypting and/or decrypting the data of the first and second memory pages. In another example, the guest program may be executed by a third virtual machine and the first, second, and third virtual machines may share a common cryptographic input for encrypting and/or decrypting the data of the first and second memory pages. In either example, the guest program may be activated by the hypervisor in response to the hypervisor detecting that a quantity of available physical data storage is below a threshold value (below 10% availability) and may be deactivated in response to the hypervisor detecting that the quantity of available physical data storage is above a threshold value (e.g., above 25% availability).

In one example, enabling the guest program may involve the hypervisor activating a lean virtual machine that executes the guest program without executing a full guest operating system. The hypervisor may update the lean virtual machine to associate it with the common cryptographic input of the first virtual machine and the second virtual machine. The hypervisor may configure the lean virtual machine to access storage (e.g., memory) of the first and second virtual machines by mapping the first storage device and the second storage device into guest storage of the third virtual machine.

At block 604, the hypervisor may receive an indication from the guest program that the first memory page and the second memory page are duplicate memory pages. The indication may be initiated by the guest program by making a hypercall to the hypervisor and the hypercall may indicate one or more guest physical addresses of the duplicate memory pages. The duplicate memory pages may include equivalent data that is encrypted with different location dependent cryptographic input when stored in a storage device. The different location dependent cryptographic input corresponds to different host physical addresses for the first and second memory pages. The encrypted data may be accessible to the guest program in a decrypted form and is inaccessible to the hypervisor in the decrypted form. This may enable the first and second memory pages to be compared by the guest program but not the hypervisor. In one example, the first and second memory pages may be selected by the guest program and then compared. In another example, the first and second memory pages may be selected by the hypervisor and compared by the guest program. In the latter example, the hypervisor may have added the first and second memory pages to a set of candidate memory pages and provide the set to the guest program. In either example, the selection may be in view of a heuristic that uses modification times of memory pages.

At block 606, the processing device may update the duplicate memory pages to reference a common storage location in host memory. Updating the duplicate memory pages may involve updating the second memory page to reference a physical storage location of the first memory page. In one example, the duplicate memory pages may correspond to duplicate pages in physical memory and the update may remove one of the duplicate pages from physical memory by associating both memory pages with the same location in physical memory (e.g., common host memory location). Responsive to completing the operations described herein above with references to block 606, the method may terminate.

Figure 7:
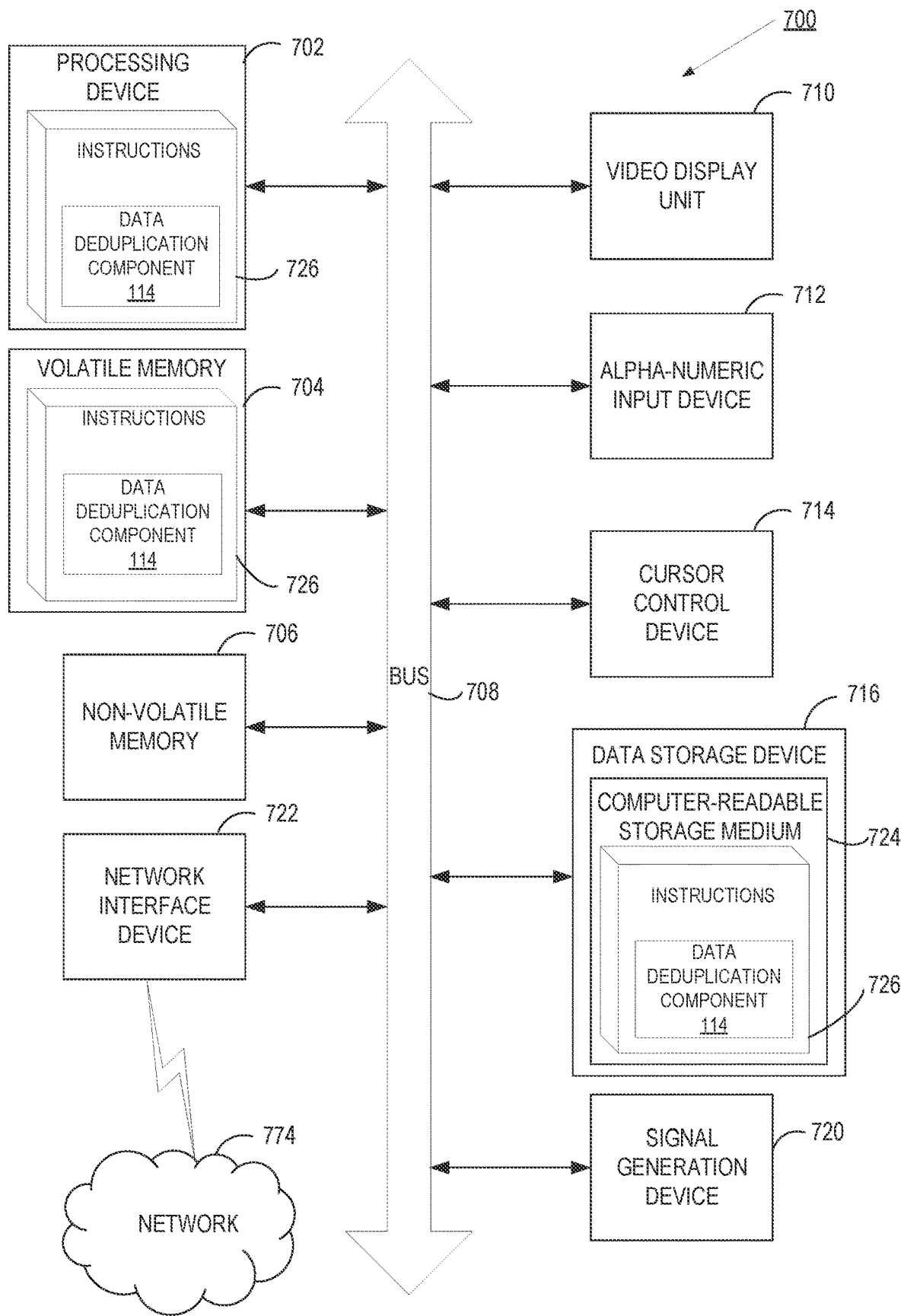
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding data deduplication component 114 or 127 of FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    enabling, by a kernel, a guest program of a container to access a first storage block of a first container and a second storage block of a second container;
    providing, by the kernel, to the guest program, a set of one or more candidate storage blocks;
    receiving, by the kernel, from the guest program, an indication that the first storage block and the second storage block are identified, among the set of one or more candidate storage blocks, as duplicate storage blocks; and
    updating the first storage block or the second storage block to cause the duplicate storage blocks to reference a common storage location.

2. The method of claim 1, wherein the duplicate storage blocks comprise encrypted data that is accessible to the guest program of the container in a decrypted form and is inaccessible to the kernel in the decrypted form.

3. The method of claim 1, wherein the duplicate storage blocks correspond to duplicate pages in physical memory of one or more host machines, the method further comprising removing at least one of the duplicate pages from the physical memory by updating and freeing the at least one of the duplicate pages.

4. The method of claim 1, further comprising activating the guest program in response to detecting that a quantity of available physical data storage is below a threshold value.

5. The method of claim 1, further comprising deactivating the guest program in response to detecting that a quantity of available physical data storage is above a threshold value.

6. The method of claim 1, wherein the duplicate storage blocks comprise equivalent data that is encrypted with different location dependent cryptographic input when stored in a storage device.

7. The method of claim 6, wherein the different location dependent cryptographic input corresponds to different host physical addresses for the first and second storage blocks.

8. The method of claim 1, wherein the first storage block and the second storage block comprise data that is decrypted by a hardware device using one or more cryptographic keys that are inaccessible to the kernel, wherein the one or more cryptographic keys comprise a cryptographic key that is based on a common cryptographic input that is shared by multiple containers and a location dependent cryptographic input.

9. The method of claim 1, wherein the container that executes the guest program is the first container, and wherein the first container and the second container share a common cryptographic input for decrypting data of the first storage block and data of the second storage block.

10. The method of claim 1, wherein the container that executes the guest program is a third container, and wherein the first container, the second container, and the third container share a common cryptographic input for decrypting data of the first storage block and data of the second storage block.

11. The method of claim 1, wherein enabling the guest program comprises:
   activating, by the kernel, a third container that executes the guest program; and
   configuring the third container to access memory of the first container and memory of the second container.

12. The method of claim 1, further comprising
   selecting, by the kernel, a set of candidate storage blocks in view of a heuristic that uses modification times of storage blocks, wherein the set of candidate storage blocks comprises identification data of the first storage block of the first container and identification data of the second storage block of the second container.

13. The method of claim 1, wherein receiving the indication that the first storage block and the second storage block are duplicate storage blocks is in view of the guest program making a system call to the kernel, wherein the system call indicates one or more guest physical addresses of the duplicate storage blocks.

14. The method of claim 1, wherein updating the duplicate storage blocks comprises the kernel or host operating system updating the second storage block to reference a physical storage location of the first storage block.

15. A system comprising:
   a memory; and
   a processing device communicably coupled to the memory, the processing device to:
      enable, by a kernel, a guest program of a container to access a first storage block of a first container and a second storage block of a second container;
      provide, by the kernel, to the guest program, a set of one or more candidate storage blocks;
      receive, by the kernel, from the guest program, an indication that the first storage block and the second storage block are identified, among the set of one or more candidate storage blocks, as duplicate storage blocks; and
      update the first storage block or the second storage block to cause the duplicate storage blocks to reference a common storage location.

16. The system of claim 15, wherein the duplicate storage blocks comprise encrypted data that is accessible to the guest program of the container in a decrypted form and is inaccessible to the kernel in the decrypted form.

17. The system of claim 15, wherein the duplicate storage blocks correspond to duplicate pages in physical memory of one or more host machines, and wherein the processing device is further to remove at least one of the duplicate pages from the physical memory by updating and freeing the at least one of the duplicate pages.

18. A non-transitory machine-readable storage medium storing instructions which, when executed, cause a processing device to perform operations comprising:
   enabling, by a kernel, a guest program of a container to access a first memory page of a first container and a second memory page of a second container;
   providing, by the kernel, to the guest program, a set of one or more candidate storage blocks;
   receiving, by the kernel, from the guest program, an indication that the first memory page and the second memory page are identified, among the set of one or more candidate storage blocks, as duplicate memory pages; and
   updating the first storage block or the second storage block to cause the duplicate memory pages to reference a common storage location in a physical memory device.

19. The non-transitory machine-readable storage medium of claim 18, wherein the duplicate memory pages comprise encrypted data that is accessible to the guest program of the container in a decrypted form and is inaccessible to the kernel in the decrypted form.

20. The non-transitory machine-readable storage medium of claim 18, further comprising activating the guest program in response to detecting that a quantity of available physical memory is below a threshold value.

* * * * *